Sept. 12, 1950 P. LINDSAY 2,522,385
TRAILER DUMPING HITCH
Filed Aug. 30, 1948 2 Sheets-Sheet 1
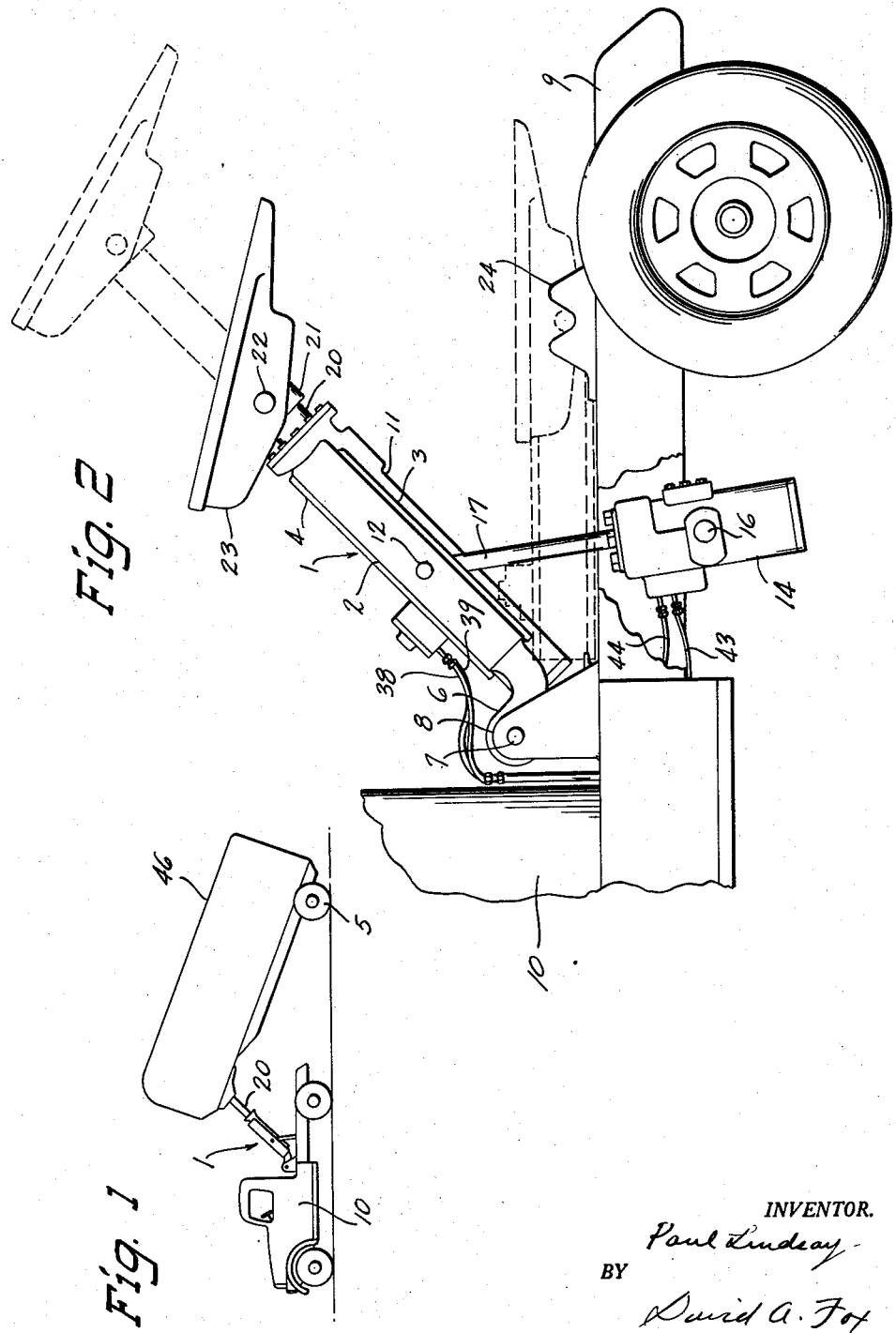
INVENTOR.
Paul Lindsay
BY
David A. Fox
Attorney Sept. 12, 1950 P. LINDSAY 2,522,385
TRAILER DUMPING HITCH
Filed Aug. 30, 1948 2 Sheets-Sheet 2
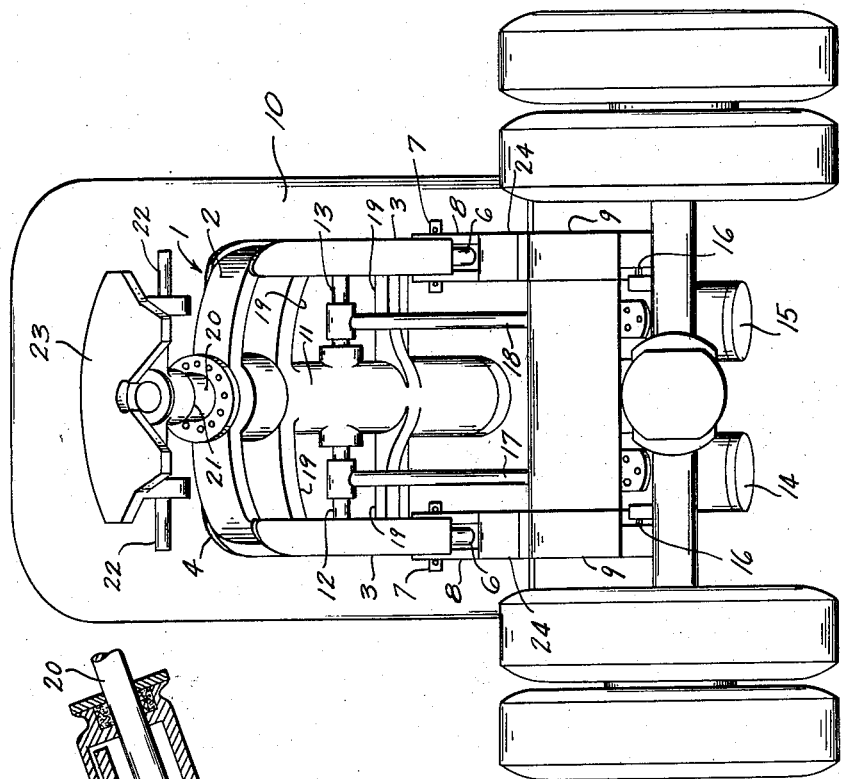
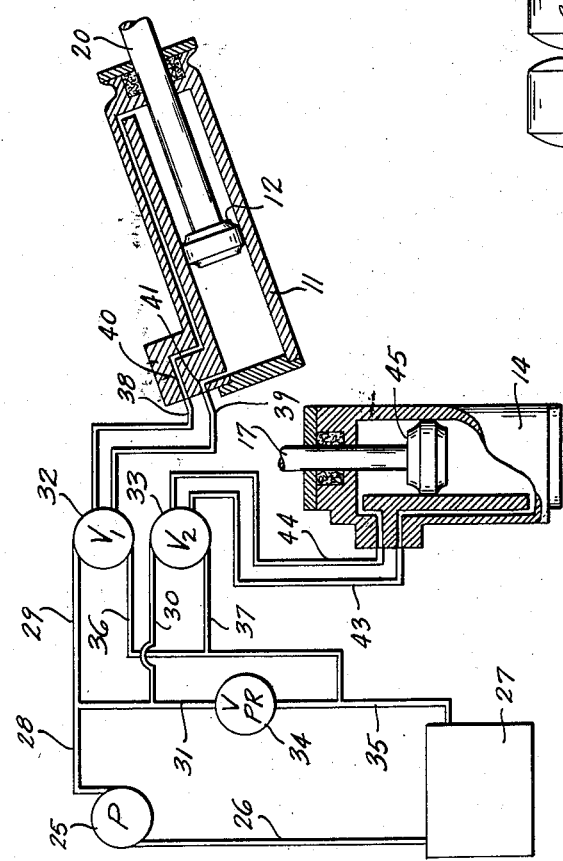
INVENTOR.
Paul Lindsay
BY
David G. Fox
Attorney Patented Sept. 12, 1950

2,522,385

UNITED STATES PATENT OFFICE 2,522,385

TRAILER DUMPING HITCH

Paul Lindsay, Monroe, Wis., assignor of one-half to Ralph A. Lindsay, Monroe, Wis.

Application August 30, 1948, Serial No. 46,770

4 Claims. (Cl. 298—22)

This invention relates to automotive vehicles of the tractor-trailer type. More specifically it resides in an improved form of the same in which there is combined with a tractor of the automotive type an elevatable fifth wheel carried on the end of an extendable boom which in turn is pivotally mounted on the tractor frame.

Heretofore elevatable fifth wheels have been employed for the purpose of imparting a dumping action to trailer type vehicles. Limitations have however heretofore restricted use of such apparatus. For example, trailers having large load capacity unless specially constructed could not be raised by apparatus heretofore available to a sufficient angle to cause discharge of the load with certainty.

In order to overcome the limitations of previous designs it is an object of this invention to provide an apparatus that may be installed with a minimum of alteration of tractors of conventional form, thus reducing the expense of construction.

Further, it is an object of this invention to provide an apparatus permitting continued use of the tractor without alteration of trailers of the usual commercial form, thus permitting interchangeable use of any commercial trailer with a tractor embodying the novel features of this invention.

A further object of this invention is to provide a means for imparting a maximum height to the forward end of a trailer with a minimum forward displacement of the rear end of the trailer.

The foregoing and other objects and advantages of this invention will become apparent from the description which follows.

In the description reference is made to the accompanying drawings which form a part hereof and in which there is set forth by way of illustration and not of limitation one form of the apparatus of this invention.

In the drawings:

Fig. 1 is a side view in elevation depicting a trailer and tractor joined by an elevating apparatus constructed in accordance with this invention with the elevating mechanism shown in raised position;

Fig. 2 is a detailed fragmentary side view in elevation with parts broken away from the tractor and elevating apparatus depicted in Fig. 1;

Fig. 3 is a detailed rear view in elevation of the tractor depicted in Fig. 1, and Fig. 4 is a schematic representation of a form of hydraulic control system which may be employed in this invention.

Referring now to the drawings, there is shown in Figs. 2 and 3 a boom 1 made up of a U shaped frame 2 with reinforcing lower plates 3 and reinforcing upper plate 4 extending across the opening of the frame 2. Frame 2 terminates at its ends in offset boom feet 6 which pivotally engage pins 7 mounted in turn in brackets 8 secured to the main longitudinal frame members 9 of the tractor 10. The boom frame 2 is divided longitudinally by an extension ram cylinder 11, to be described in greater detail hereinafter, and secured between the sides of the frame 2 and the cylinder 11 are transverse elevating shafts 12 and 13.

To cause an elevating and lowering movement of boom 1 elevating ram cylinders 14 and 15 are mounted within the frame members 9 of tractor 10. The cylinders 14 and 15 are furnished with piston rods 17 and 18 which extend upwardly into pivotal connection with the transverse elevating shafts 12 and 13. Ram cylinders 14 and 15 are preferably formed as one integral assembly which is rockably mounted between the frames 9 by means of trunnions 16 which permit the cylinders 14 and 15 to move to accommodate the change in alignment which occurs upon raising and lowering of boom 1. Raising and lowering of boom 1 is caused to take place by admission and withdrawal of fluid from cylinders 14 and 15 in a manner to be more fully described hereinafter.

Ram cylinder 11, as previously noted, is mounted longitudinally within frame 2 and is firmly secured thereto by welded cross brackets 19. An extension member in the form of a piston plunger 20 is slidably carried within the cylinder 11. Mounted at the free end of plunger 20 is a rotatable hub 21 having shaft arms 22 extending radially outward in diametrically opposed relationship upon which pivotally is mounted a conventional fifth wheel 23. In this way a universal connection between the piston plunger 20 and the fifth wheel 23 is provided permitting the fifth wheel to tilt vertically and horizontally into any position desired. Upon application of fluid to cylinder 11, to be more fully described hereinafter, fifth wheel 23 is extended to or retracted from a position rearwardly of the boom 1, as shown in Fig. 2.

Mounted upon frames 9 of the tractor 10 are grooved sockets 24 in position to receive and hold the outer ends of shafts 22 upon the retracting of piston rods 17, 18 and piston plunger 20 within their respective cylinders.

Referring now to Fig. 4 a form of hydraulic system suitable for operation of the apparatus of this invention is shown. In this hydraulic system a pump 25 is provided which has an input pipe 26 leading from a reservoir sump 27. A discharge pipe 28 extending from pump 25 branches into three channels 29, 30 and 31 leading respectively to four way control valves 32 and 33 and a pressure relief valve 34. Valve 34 is connected directly to the sump 27 by pipe 35, pipe 35 being joined by outlet pipes 36 and 37 leading from control valves 32 and 33. Valve 32 controls the extension ram cylinder 11 by means of hose line connections 38 and 39 connected from valve 32 to the ports 40 and 41 of cylinder 11, disposed on opposite sides of piston 42 as shown. In like manner valve 33 is connected by hose lines 43 and 44 to cylinder 14 having a slidably mounted piston 45 carrying the piston shaft 17. The hose lines 43 and 44 are also connected to cylinder 15 not shown in Fig. 4.

For the operation of the apparatus above described a trailer may be placed in locked connection with the fifth wheel 23 in conventional manner, the fifth wheel being in fully retracted position, as shown by the dotted lines in Fig. 2. This position is assumed for transit with the trailer load being carried directly by the frame members 9 due to engagement of shafts 22 that carry fifth wheel 23 with grooved sockets 24.

To raise the trailer to a dumping position pump 25 is placed in operation by driving means not shown to provide pressure within the hydraulic system. Valves 32 and 33 are moved from a closed to a first or raising position permitting fluid from the pump 25 to enter cylinders 11 and 14 and to act upon the respective pistons 42 and 45. At the same time fluid on the piston rod side of the respective pistons is allowed to flow from the cylinders 11 and 14 through the control valves and thence to the sump 27 whereupon the boom 1 rises and member 20 is extended. Upon returning valves 32 and 33 to closed position a trapped fluid condition within the cylinders is created, thus providing a means for holding the trailer at any angle of desired elevation. Pressure relief valve 34 will pass fluid directly from pump 25 to sump 27 upon the closing of valves 32 and 33 or upon the pistons reaching the limit of their travel within the cylinder barrels.

Referring to Fig. 1 it is readily seen that the combined action of raising the boom 1 and extending the ram 20 imparts an increased elevation to a conventional trailer 46 over that which can be imparted by a simple boom of restricted length. At the same time the forward travel of the rear wheels 5 of the trailer 46 is small in amount.

Upon placing valves 32 and 33 in a second or lowering position the operation within the cylinders 11 and 14 is reversed and descent of boom 1 and piston plunger 20 occurs.

I claim:

1. In a vehicle of the tractor-trailer class the combination with a tractor of a boom pivotally attached at its forward end to said tractor, elevating means mounted upon said tractor cooperatively engaging said boom to raise and lower the same, an extendable member positioned upon said boom adapted to be extended rearwardly therefrom, and a fifth wheel mounted upon said extendable member.

2. In a vehicle of the tractor-trailer class the combination with a tractor of a boom pivotally attached at its forward end to said tractor, elevating means positioned on said tractor cooperatively engaging said boom to raise and lower the same, a hydraulic cylinder barrel longitudinally secured to said boom, a piston closely received by and slidably mounted within said cylinder barrel, a piston plunger connected to said piston and extending rearwardly therefrom, means for supplying and exhausting fluid from said cylinder to cause said piston to oscillate within said cylinder, and a fifth wheel pivotally mounted upon said piston plunger.

3. In a vehicle of the tractor-trailer class the combination with a tractor of a boom pivotally attached at its forward end to said tractor, hydraulic cylinder means disposed beneath said boom and pivotally connected to said tractor, piston means closely received by and slidably mounted within said cylinder means, a shaft conection between said boom and said piston means, a second hydraulic cylinder means secured to said boom, a second piston means closely received by and slidably mounted within said second cylinder means, plunger means connected to said second piston means and extending rearwardly therefrom, a fifth wheel pivotally mounted upon the rearward end of said plunger means, and means for supplying and exhausting fluid from said cylinder means respectively to cause said piston means to oscillate within said cylinder means respectively.

4. In a vehicle of the tractor-trailer class the combination comprising a tractor, a boom pivotally attached at its forward extremity to said tractor, an elevating means positioned upon said tractor and connected to said boom to raise and lower the same, a hydraulic cylinder barrel supported in longitudinal relation upon said boom, a piston closely received by and slidably mounted within said cylinder barrel, a piston plunger connected to said piston and extending rearwardly therefrom, means for supplying and exhausting fluid from said cylinder to cause said piston to oscillate within said cyilnder, a pair of trunnions extending in a radial direction from the projecting end of said piston plunger, a fifth wheel mounted upon said trunnions, and receiving sockets mounted upon said tractor to engage said trunnions upon a retraction of said boom and said piston plunger.

PAUL LINDSAY.

REFERENCES CITED

The following references are of record in the file of this patent:

UNITED STATES PATENTS

| Number | Name | Date |
| --- | --- | --- |
| 2,027,098 | Helms | Jan. 7, 1936 |
| 2,220,815 | Feilcke | Nov. 5, 1940 |